No. 625,143. Patented May 16, 1899.
J. S. BUSKY.
FUMIGATING SHOE TREE.
(Application filed Jan. 10, 1899.)
(No Model.)
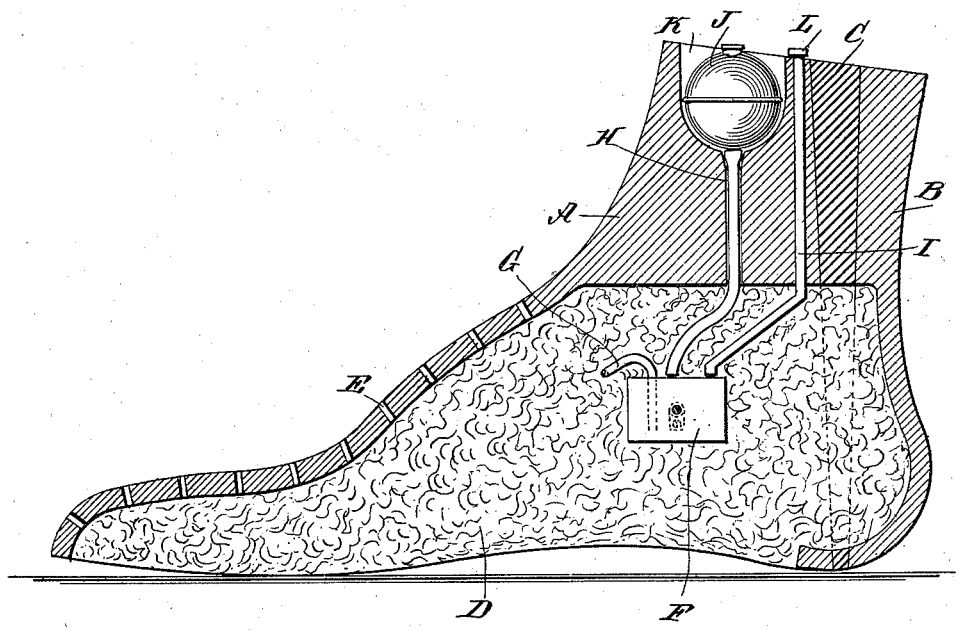
WITNESSES:
William P. Goebel
H. L. Reynolds
INVENTOR
John S. Busky.
BY
ATTORNEYS.
THE NORRIS PETERS CO., PHOTO-LITHO., WASHINGTON, D. C.

UNITED STATES PATENT OFFICE.

JOHN S. BUSKY, OF NEW YORK, N. Y.

FUMIGATING SHOE-TREE.

SPECIFICATION forming part of Letters Patent No. 625,143, dated May 16, 1899.

Application filed January 10, 1899. Serial No. 701,737. (No model.)

*To all whom it may concern:*

Be it known that I, JOHN S. BUSKY, of the city of New York, borough of Brooklyn, in the county of Kings and State of New York, have invented a new and Improved Fumigating Shoe-Tree, of which the following is a full, clear, and exact description.

My invention relates to an improvement in shoe-trees designed for insertion in shoes or boots to preserve their form and also to fumigate the same; and it consists of hollowing the tree and placing therein an antiseptic or fumigating apparatus which is provided with means for impregnating it with an antiseptic liquid, the tree being provided with openings from the interior cavity to the outside, through which the liquid may act upon the shoe.

My invention comprises the novel features hereinafter described and claimed.

Reference is to be had to the accompanying drawing, forming a part of this specification, in which the figure is a sectional side elevation of a shoe-tree constructed in accordance with my invention.

This tree is intended particularly for use in shoes which are in service and is to be inserted in the shoe when removed from the foot. For convenience of insertion within the shoe the tree is made in sections, the main body A including the instep and all forward thereof and a portion of the leg, the rear portion B including the heel, and the central portion C forming a wedge insertible between the other sections, so as to force them into intimate contact with the shoe. The object in making the tree in sections is to make it convenient of insertion, and if this could be done without making the tree in sections it would answer the purpose as well.

The tree is hollowed out, as shown in the drawing, providing a large interior cavity, which is preferably filled with an absorbent fibrous mass D of cotton or any other convenient or suitable material. This interior cavity opens toward the bottom by a large opening which, as herein shown, is nearly the area of the bottom of the tree. The cotton or other fibrous material contained in said cavity will thus be brought into direct contact with the sole of the shoe. In practice the cotton is placed very loosely within this cavity, so that it will not interfere with the insertion or withdrawal of the heel and wedge sections, and, in fact, the cotton would preferably lie wholly in front of the wedge-section, as otherwise it might be difficult to insert these sections unless they were cut away at their lower ends or a partition extended across the rear end of the main section. Either of these expedients might be adopted, if desired. The upper side of the tree is also provided with a series of holes E, which may be made of any convenient size, and the side wall of the tree may also be provided with similar holes, so that the fumigating liquid may have a chance to act upon the upper leather of the shoe.

Within the interior cavity is placed a reservoir F for containing the fumigating liquid. This reservoir is provided with a tube G, constructed after the manner of the nozzle of ordinary atomizers or spraying mechanisms. This reservoir is supported within the cavity by any suitable means.

The upper portion of the tree is provided with two channels or holes, one receiving a tube H, which connects with the reservoir F and with an air-compressing bulb or other suitable mechanism J, located in the upper portion of the tree. The bulb is herein shown as occupying a depression K, formed in the upper end of the tree. By compressing the bulb air may be forced in the reservoir F and the contents thereof discharged into the chamber, moistening the cotton or other absorbent material which may be contained therein and saturating the air and walls when such material is omitted. The other channel or hole contains a tube I, which is connected with the reservoir and at its upper end is provided with a removable cap L. Through this tube the liquid may be conducted to the reservoir.

The size of the cavity within the tree is not material, so long as it is in communication with the body of the shoe at such points as it is desired to have the liquid act upon. In order to make the tree light and easy of transportation, it is desirable to make this cavity as large as possible. Aside from this feature it would, however, be sufficient to make the cavity much less in size than that shown in the drawing.

In using this device it is placed within the shoe and a sufficient amount of liquid discharged by working the air-forcing bulb J. The tree is left in the shoe over night or as long as desired to accomplish its purpose. The result will be the perfect fumigation of the shoe. It will destroy any odor which it may have, and it will also act upon the leather as a preservative, keeping it in a perfect condition, and thus assuring a longer wear.

Although the use of cotton or similar absorbent material is preferred, it is obvious that the device will be operative without this, as the spray will saturate the confined air and moisten the walls, so as to secure practically the same results.

Having thus fully described my invention, I claim as new and desire to secure by Letters Patent—

1. A hollow shoe-tree, having openings extending from the interior cavity to the exterior of the tree, an absorbent fibrous filler in said cavity, and a fumigating device discharging into said filler, substantially as described.

2. A hollow shoe-tree, having openings extending from the interior cavity to the exterior, and a reservoir in said cavity having an atomizing or spraying mechanism connected thereto and discharging into said cavity, substantially as described.

3. A shoe-tree, having an interior cavity opening at the bottom, and having holes through the walls thereof above the bottom, and a spraying device discharging into said cavity, substantially as described.

4. A shoe-tree, having an interior cavity opening at the bottom, and having holes through the walls thereof above the bottom, an absorbent fibrous filler for said cavity, and a spraying device discharging into said filler, substantially as described.

5. A hollow shoe-tree, having openings extending from the interior cavity to the exterior of the tree, a reservoir having an atomizing or spraying mechanism connected thereto and discharging into said cavity, a tube extending upward from said reservoir, and an air-forcing device secured to the upper end of said tube, substantially as described.

6. A hollow shoe-tree, having openings extending from the interior cavity to the exterior of the tree, a reservoir having an atomizing or spraying mechanism connected thereto and discharging into said cavity, a tube extending upward from said reservoir, and an air-forcing device secured to the upper end of said tube, the tree having a cavity in its upper end receiving said air-forcing device, substantially as described.

7. A hollow shoe-tree, having openings extending from the interior cavity to the exterior of the tree, a reservoir having an atomizing or spraying mechanism connected thereto and discharging into said cavity, a tube extending upward from said reservoir, an air-forcing device secured to the upper end of said tube, and a filling-tube extending upward from the reservoir, the tree being provided with channels for receiving said tubes, substantially as described.

8. A hollow shoe-tree, constructed in sections, and having openings extending from the interior cavity to the exterior of the tree, and a fumigating device within said cavity, substantially as described.

9. A hollow shoe-tree, constructed in sections, and having openings extending from the interior cavity to the exterior of the tree, an absorbent fibrous filler in said cavity, and a fumigating device discharging into said filler, substantially as described.

JOHN S. BUSKY.

Witnesses:
JOHN DAVENPORT,
G. M. JEFFERY.